Feb. 1, 1949. A. N. SZWARGULSKI 2,460,371
MOTOR COOLING MEANS
Filed March 31, 1947
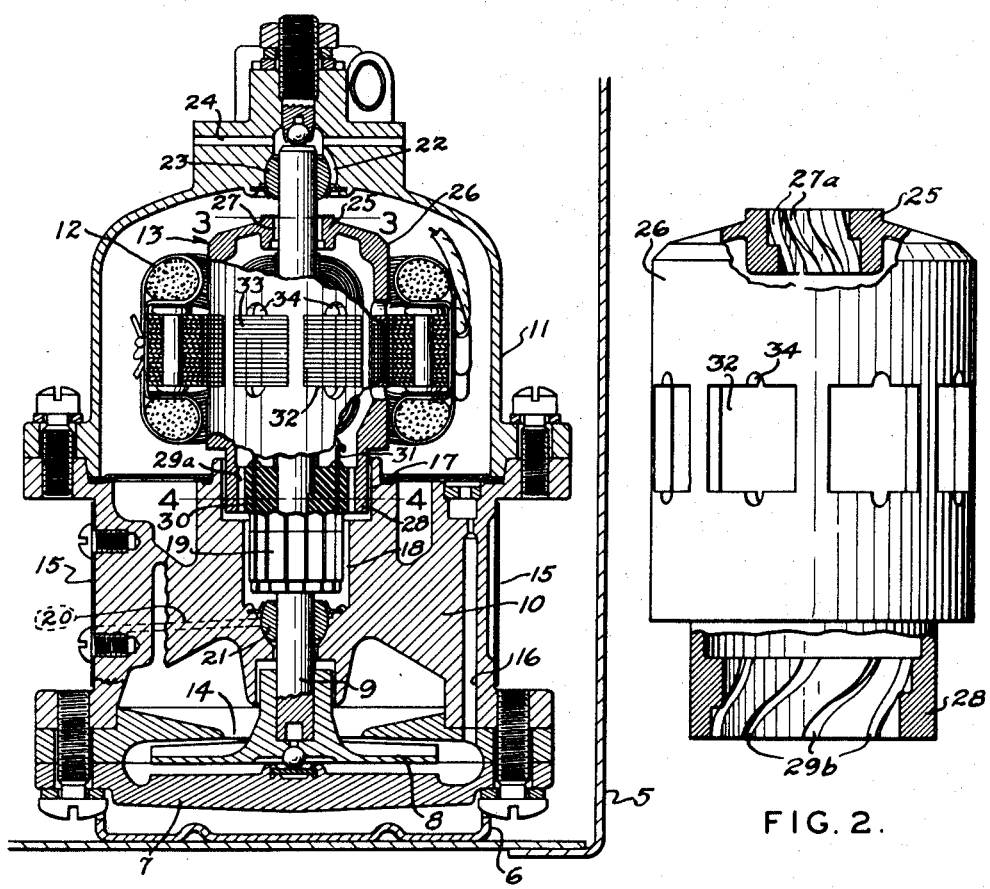
FIG. 1.
FIG. 2.
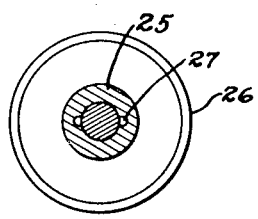
FIG. 3.
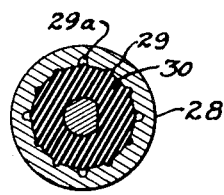
FIG. 4.
INVENTOR
ALEX N. SZWARGULSKI
BY
George R. Ericson
ATTORNEY Patented Feb. 1, 1949

2,460,371

UNITED STATES PATENT OFFICE 2,460,371

MOTOR COOLING MEANS

Alex N. Szwargulski, St. Louis, Mo., assignor to Carter Carburetor Corporation, St. Louis, Mo., a corporation of Delaware Application March 31, 1947, Serial No. 738,485

2 Claims. (Cl. 172—36)

This invention relates to electric motors and consists particularly in novel means for cooling the armature of a motor such as is used with the electric fuel pump illustrated in Korte Patent No. 2,394,860.

The electric motor which operates the pump impeller in the above patent operates submerged in the fuel tank and with the motor field and armature constantly bathed in the liquid fuel. The armature is provided with a streamlined housing to reduce the drag caused by the liquid. However, it has been found that, in some instances, the armature windings become excessively hot so as to endanger the insulation of the windings and solder connections.

Consequently, it is an object of the present invention to provide simple and effective means for cooling the motor armature windings.

Another object is to provide means for utilizing the motion of the armature itself to cause a cooling flow of ambient liquid across the windings.

These objects and other more detailed objects hereafter appearing are attained by the structure illustrated in the accompanying drawing in which Fig. 1 is a vertical section illustrating an electric fuel pump of the type covered in the above patent and embodying the present invention.

Fig. 2 shows a modified form of armature casing on an enlarged scale, parts being sectioned for clearer illustration.

Figs. 3 and 4 are detail sections through the armature casing taken on lines 3—3 and 4—4 of Fig. 1.

The electric fuel pump is shown mounted at the bottom of a fuel tank 5 by means of a suitable bracket 6. At the lower portion of the device there is provided a pump volute casing 7 within which rotates the centrifugal impeller 8 rigidly secured to a vertical shaft 9. Located above the pump casing and rigidly secured thereto by radial ribs 10 is a housing 11 within which is mounted an electric motor including field coil 12 and an armature, generally indicated at 13 mounted on shaft 9. The fuel enters intake throat 14 of the pump through a screen 15 between housing 11 and the pump casing and is discharged through a suitable outlet fitting (not shown) at the periphery of the volute. A portion of the pumped liquid is by-passed through a passage 16 into the interior of housing 11. This by-passed liquid completely bathes the motor and is discharged partly through annular spaces 17 and 18 around the lower end of the armature and the commutator 19 and a return passage to the tank, indicated in part at 20 from the vicinity of lower shaft bearing 21. The fuel within the casing is also discharged upwardly through a passage 22 by-passing upper shaft bearing 23, and lateral openings 24.

In the above mentioned Korte patent, a casing substantially completely encloses the armature windings. However, in the present instance, the upper shaft boss 25 of casing 26 is provided with a pair of grooves 27. The tubular bottom end 28 of the casing is provided with an annular series of shallow grooves 29 which tightly receive insulation 30, imbedding commutator connection 31, and deeper grooves 29a. The side wall of the casing is also provided with a series of openings 32 for armature laminations 33, the recesses 34 being left open. These recesses, of course, are spaced substantially outwardly or radially from end openings 27 and 29.

During operation of the motor, ambient liquid within casing 11 is caused to flow by centrifugal force inwardly through end openings 27 and 29a and outwardly through side recesses 34. Thus, a cooling flow of the liquid constantly passes over the armature windings during operation of the motor.

In Fig. 2 spiral grooves 27a and 29b replace the axially aligned inlet grooves of Fig. 1. Grooves 27a and 29b incline outwardly in the general direction of rotation of the armature so as to facilitate the entry of liquid into the casing The openings provided for circulation may be shaped and disposed otherwise as long as the inlet and outlet openings are substantially spaced radially so that the centrifugal force set up by rotation of the armature tends to draw liquid through the innermost opening and expel it through the outermost openings. The exact form of the motor and fuel pump, of course, are not essential.

The invention may be modified in various respects as will occur to those skilled in the art and the exclusive use of all modifications as come within the scope of the appended claims is contemplated.

I claim:

1. An armature for an electric motor comprising a shaft having core structure projecting laterally therefrom and windings received about said shaft and core structure, a hollow casing enclosing said windings and core structure and having peripheral openings into which the extremities of said core structure project, there being openings in the end wall of said casing adjacent said armature and open space in said peripheral openings adjacent said core extremities for creating a cooling flow of ambient fluid through said armature by centrifugal force upon rotation thereof.

2. An armature for an electric motor comprising a shaft having laminated core structure projecting laterally therefrom and windings received about said shaft and core structure, and a hollow casing substantially enclosing said windings and core structure, there being open spaces within said casing from end to end and along said windings and core structure and there being first and second openings, respectively, in the end wall of said casing and in the side wall thereof spaced radially apart for setting up a flow of cooling ambient fluid through the armature by centrifugal force upon rotation thereof, said core structure extending into and closely conforming with said second opening except for a reduced recess in the periphery thereof for discharge of cooling fluid from the armature.

ALEX N. SZWARGULSKI.

REFERENCES CITED

The following references are of record in the file of this patent:

UNITED STATES PATENTS

| Number | Name | Date |
|---|---|---|
| 2,120,914 | Vogel | June 14, 1938 |

FOREIGN PATENTS

| Number | Country | Date |
|---|---|---|
| 170,946 | Great Britain | Oct. 31, 1921 |
| 516,866 | France | Dec. 10, 1920 |